(12) United States Patent
Kim et al.

(10) Patent No.: US 10,462,756 B2
(45) Date of Patent: Oct. 29, 2019

(54) METHOD AND APPARATUS FOR CONTROLLING TRANSMISSION POWER OF TERMINAL IN MOBILE COMMUNICATION SYSTEM

(71) Applicant: Samsung Electronics Co., Ltd., Gyeonggi-do (KR)

(72) Inventors: Yongseok Kim, Incheon (KR); Hyunseok Ryu, Gyeonggi-do (KR); Hyunkyu Yu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/100,849

(22) Filed: Aug. 10, 2018

(65) Prior Publication Data

US 2019/0053172 A1    Feb. 14, 2019

(30) Foreign Application Priority Data

Aug. 10, 2017 (KR) .......... 10-2017-0101956
Sep. 11, 2017 (KR) .......... 10-2017-0116110

(51) Int. Cl.
*H04W 52/14* (2009.01)
*H04W 52/48* (2009.01)
(Continued)

(52) U.S. Cl.
CPC .......... *H04W 52/48* (2013.01); *H04W 52/12* (2013.01); *H04W 52/16* (2013.01);
(Continued)

(58) Field of Classification Search
CPC .............................. H04W 52/48; H04W 52/12
See application file for complete search history.

(56) References Cited

U.S. PATENT DOCUMENTS

2006/0056355 A1* 3/2006 Love .......... H04W 72/042
370/332
2015/0270868 A1 9/2015 Park
(Continued)

FOREIGN PATENT DOCUMENTS

| WO | WO 2014/007531 | 1/2014 |
| WO | WO 2016/099101 | 6/2016 |
| WO | WO 2017/131465 | 8/2017 |

OTHER PUBLICATIONS

NSN, Nokia, "Enhanced UL Power Control for TDD eIMTA", R1-133473, 3GPP TSG-RAN WG1 Meeting #74, Aug. 19-23, 2013, 2 pages.

(Continued)

*Primary Examiner* — Tuan H Nguyen
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method for transmitting data by a terminal in a mobile communication system, a method for receiving data by a base station in a mobile communication system, a terminal in a mobile communication system, and a base station in a mobile communication system are provided. The method for transmitting data by a terminal in a mobile communication system includes receiving, from a base station, first control information for transmitting a first data; after receiving the (Continued)

first control information, receiving, from the base station, second control information for transmitting a second data; transmitting, to the base station, the second data corresponding to the second control information; and after transmitting the second data, determining a transmission power of the first data corresponding to the first control information based on a transmission power of the second data.

15 Claims, 12 Drawing Sheets

(51) Int. Cl.
    *H04W 52/12*     (2009.01)
    *H04W 52/16*     (2009.01)
    *H04W 52/22*     (2009.01)
    *H04W 52/50*     (2009.01)

(52) U.S. Cl.
    CPC ......... *H04W 52/228* (2013.01); *H04W 52/50* (2013.01); *H04W 52/146* (2013.01)

(56) References Cited

U.S. PATENT DOCUMENTS

2016/0330696 A1* 11/2016 Suzuki ................ H04W 52/242
2017/0374624 A1   12/2017 Ahn et al.
2018/0317244 A1   11/2018 Um et al.

OTHER PUBLICATIONS

International Search Report dated Nov. 12, 2018 issued in counterpart application No. PCT/KR2018/009117, 3 pages.

* cited by examiner

METHOD AND APPARATUS FOR CONTROLLING TRANSMISSION POWER OF TERMINAL IN MOBILE COMMUNICATION SYSTEM

CROSS-REFERENCE TO RELATED APPLICATIONS

This application is based on and claims priority under 35 U.S.C. § 119(a) to Korean Patent Application No. 10-2017-0101956, filed on Aug. 10, 2017, in the Korean Intellectual Property Office, and Korean Patent Application No. 10-2017-0116110, filed on Sep. 11, 2017, in the Korean Intellectual Property Office, the disclosure of each of which is incorporated by reference herein in its entirety.

BACKGROUND

1. Field

The present disclosure relates generally to a terminal power control method in a beamforming system and, more particularly, to a method and an apparatus for supporting an uplink power control of a terminal according to a variation of a beam.

2. Description of Related Art

To meet the demand for wireless data traffic which has increased since deployment of 4G communication systems, efforts have been made to develop an improved 5G or pre-5G communication system. Therefore, the 5G or pre-5G communication system is also referred to as a "beyond 4G network" or a "post LTE system." The 5G communication system is considered to be implemented in higher frequency (mmWave) bands, e.g., 60 GHz bands, so as to accomplish higher data rates. To decrease propagation loss of radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-point (CoMP), reception-end interference cancellation and the like. In a 5G system, hybrid frequency shift keying and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, and exchange and process information without human intervention. The Internet of everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been researched recently. Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology is also an example of convergence between 5G and IoT technology.

With the recent growth of long term evolution (LTE) and LTE-advanced technologies, research on a beamforming system have been actively performed. In particular, such a beamforming system needs the control of uplink transmission power according to a variation of a beam.

SUMMARY

An aspect of the present disclosure provides a method and an apparatus for controlling uplink transmission power of a terminal according to a variation of a beam in a beamforming system.

In accordance with an aspect of the present disclosure, a method for transmitting data by a terminal in a mobile communication system is provided. The method includes receiving, from a base station, first control information for transmitting a first data, after receiving the first control information, receiving, from the base station, second control information for transmitting a second data, transmitting, to the base station, the second data corresponding to the second control information, and after transmitting the second data, determining a transmission power of the first data corresponding to the first control information based on a transmission power of the second data.

According to another aspect of the present disclosure, a method for receiving data by a base station in a mobile communication system is provided. The method includes transmitting, to a terminal, first control information for receiving a first data, after transmitting the first control information, transmitting, to the terminal, second control information for receiving a second data, receiving, from the terminal, the second data corresponding to the second control information, and after receiving the second data, determining a transmission power of the first data transmitted by the terminal based on a transmission power of the second data transmitted by the terminal.

According to another aspect of the present disclosure, a terminal in a mobile communication system is provided. The terminal includes a transceiver, and a controller coupled with the transceiver and configured to control the transceiver to receive, from a base station, first control information for transmitting a first data, control the transceiver to receive, after receiving the first control information, from the base station, second control information for transmitting a second data, control the transceiver to transmit, to the base station, the second data corresponding to the second control information, and determine, after transmitting the second data, a transmission power of the first data corresponding to the first control information based on a transmission power of the second data.

According to another aspect of the present disclosure, a base station in a mobile communication system is provided. The base station includes a transceiver, and a controller coupled with the transceiver and configured to control the transceiver to transmit, to a terminal, first control information for receiving a first data, control the transceiver to transmit, after transmitting the first control information, to the terminal, second control information for receiving a second data, control the transceiver to receive, from the terminal, the second data corresponding to the second control information, and determine, after receiving the second data, a transmission power of the first data transmitted by the terminal based on a transmission power of the second data transmitted by the terminal.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
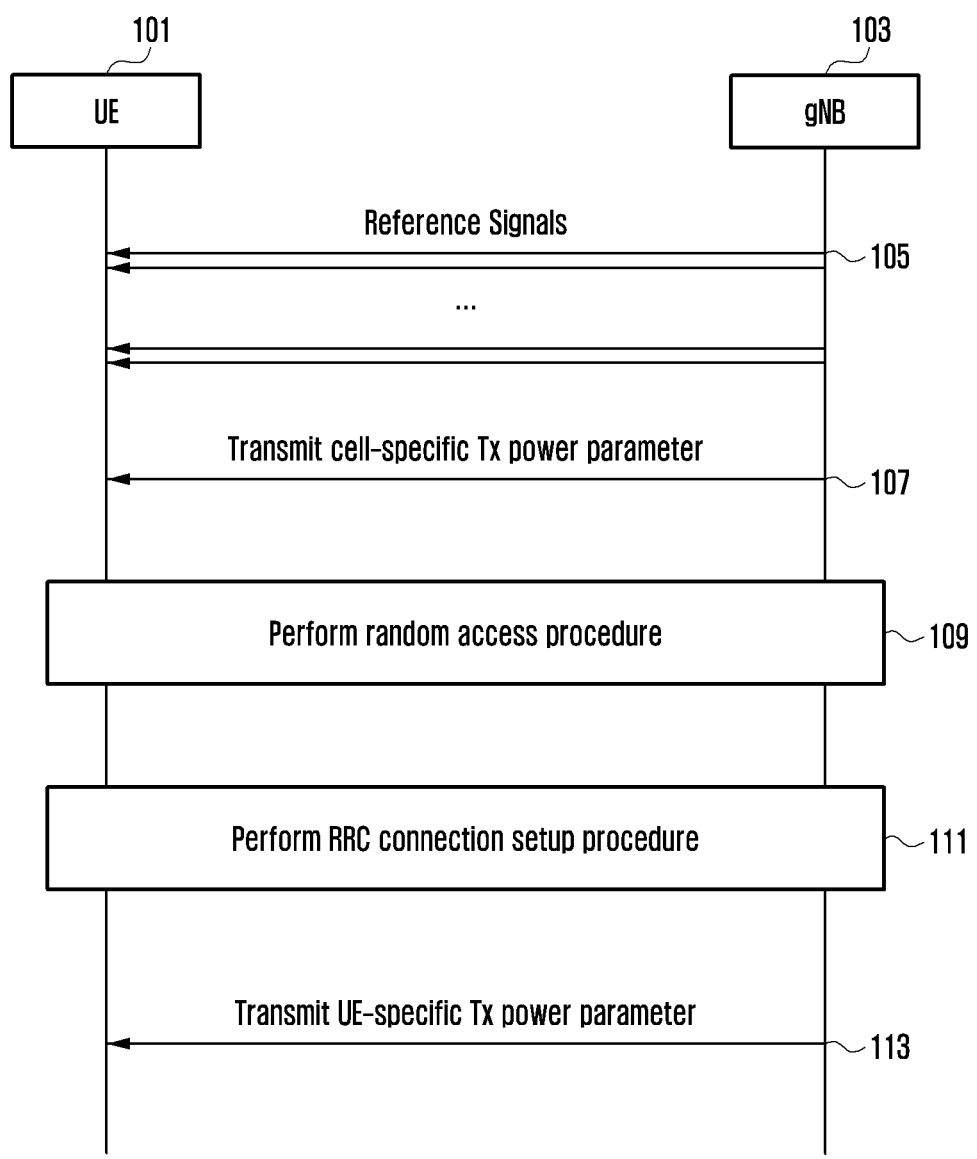
FIG. 1 is a flow diagram of a method of transmitting a parameter for transmission power control of a terminal according to an embodiment.

Hereinafter, embodiments of the present disclosure are described in detail with reference to the accompanying drawings. In the following, the descriptions of techniques that are well known in the art and are not directly related to the present disclosure are omitted. This is to clearly convey the subject matter of the present disclosure by omitting any unnecessary explanation. In addition, the terms used herein are defined in consideration of functionality and may be changed according to the intention of users, operators, or the like. Therefore, the definition of a term is intended to be based on the contents throughout the present disclosure.

The advantages and features of the present disclosure and the manner of achieving them will become apparent with reference to embodiments to be described below with reference to the accompanying drawings. The present disclosure may, however, be embodied in many different forms and is not intended to be construed as limited to the embodiments set forth herein. Rather, the embodiments are provided to fully convey the subject matter of the present disclosure to those skilled in the art. Like reference numerals refer to like elements throughout the present disclosure.

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, implementation of the 5G communication system at a super-high frequency (mmWave) band (e.g., such as a 60 GHz band) is being considered. In order to obviate a propagation loss of a radio wave and increase a delivery distance of a radio wave at the super-high frequency band, efforts are underway about various techniques such as beamforming, massive MIMO, FD-MIMO, array antenna, analog beam-forming, and large scale antenna for the 5G communication system.

Additionally, for an improvement in the 5G communication system, technical developments are being made in advanced small cell, cloud radio access network (cloud RAN), ultra-dense network, D2D communication, wireless backhaul, moving network, cooperative communication, CoMP, reception-end interference cancellation, and the like.

In addition, in the 5G communication system, FQAM and SWSC are being developed as ACM schemes, and FBMC, NOMA, and SCMA are also being developed as advanced access techniques.

The purpose of controlling the uplink transmission power of a terminal is to minimize interference affecting neighbor cells and power consumption of the terminal. Another purpose of the present disclosure is to maintain the strength of a signal received by a base station at a certain level regardless of the position of a serving cell, thereby operating a transmission signal of a terminal within a dynamic range of the automatic gain control (AGC) of a receiving end of the base station.

The present disclosure includes a technique of operating a closed-loop power control parameter between a terminal (also referred to as user equipment (UE) or mobile station (MS)) and a base station (also referred to as a BS, an enhanced node B (eNB), gNB, or BS) in a system capable of variously operating a plurality of beams, a plurality of waveforms, a plurality of subcarrier spacings, and a plurality of operating bands.

FIG. 1 is a flow diagram of a method of transmitting a transmission power control parameter from a gNB 103, according to an embodiment.

Referring to FIG. 1, since the gNB 103 does not know the capability of a UE 101 before UE capability negotiation with the UE 101, the gNB 103 may transmit cell-specific transmission power parameters at 107 which can be commonly used by all the cell-accessed UEs regardless of their capabilities. For example, in the conventional LTE, the gNB 103 can transmit $P_{0\_PUSCH}$ to the UE 101 for transmission power control of a physical uplink shared channel (PUSCH) and transmit $P_{0\_PUCCH}$ to the UE 101 for transmission power control of a physical uplink control channel (PUCCH). In this case, $P_{0\_PUCCH}$ is composed of a cell-specific parameter, $P_{0\_NOMINAL\_PUSCH}$, and a UE-specific parameter, $P_{0\_UE\_PUCCH}$. Similarly, $P_{0\_PUCCH}$ is composed of a cell-specific parameter, $P_{0\_NOMINAL\_PUCCH}$, and a UE-specific parameter, $P_{0\_UE\_PUCCH}$. The cell-specific parameters $P_{0\_NOMINAL\_PUSCH}$ and $P_{0\_NOMINAL\_PUCCH}$ may be transmitted to the UE 101 through a channel, such as a master information block (MIB) or a system information block (SIB), broadcasted by the gNB. The UE-specific parameters $P_{0\_UE\_PUSCH}$ and $P_{0\_UE\_PUCCH}$ may be stored as a single default value in the UE 101 and the gNB in a state before the UE 101 accesses the gNB 103. The default value may be set to zero. The UE 101 capability may include a measurement parameter of the UE 101, handover, beam-related characteristics of the UE 101 (e.g., the reciprocity of transmission beam and reception beam, whether it is possible to select transmission beam(s) with reception beam(s) of the UE 101, and the like).

For example, the gNB 103 may provide one or more cell-specific configuration values via a broadcast channel such as the MIB or the SIB. In this case, the cell-specific configuration value may activate a gain for each beam type used in each of various downlink signals transmitted by the gNB 103, a difference between respective signals, a beam gain difference between the transmission beam and the reception beam, and the like. Such downlink signals transmitted by the gNB 103 in 105 may be a primary synchronization signal (PSS)/secondary synchronization signal (SSS) for acquiring downlink synchronization of the UE 101, a cell-specific reference signal (CRS), and/or a demodulation reference signal (DMRS). The UE 103 may continuously use the above-mentioned default values ($P_{0\_UE\_PUSCH}$ and $P_{0\_UE\_PUCCH}$) or the above-mentioned values activated by the gNB 103 (e.g., a gain for each beam type used in each of various downlink signals transmitted by the gNB 103, a difference between respective signals, a beam gain difference between the transmission beam and the reception beam) until there is an additional command from the gNB 103 as shown in FIG. 1. This additional command (update of values $P_{0\_UE\_PUSCH}$ and $P_{0\_UE\_PUCCH}$) of the gNB 103 may be provided through UE-specific RRC signaling or L1-signaling (PDCCH) after an RRC connection setup procedure at 111 or a random access procedure at 109 is performed.

In addition, in order to reduce signaling overhead, a single $P_{0\_PUSCH}$ and $P_{0\_PUCCH}$ value may be used without a distinction between cell-specific and UE-specific parameters. This value may be transmitted to the respective UEs via UE-specific RRC signaling dedicated to each UE or transmitted to the UEs in a cell-specific manner.

In the LTE system, the transmission power of the PUSCH in the i-th transmission unit, $P_{PUSCH(i)}$, may be determined in Equation (1) as follows. The unit is dBm.

2) $M_{PUSCH}(i)$: This is the amount of resources used for PUSCH transmission in the i-th transmission unit (e.g., the number of resource blocks (RBs) used for PUSCH transmission on the frequency axis), and is determined via upper signaling from the gNB 103 to the UE 101.

3) $P_{0\_PUSCH}(j)$: $P_{0\_PUSCH}(j)$ is composed of $P_{0NOMINAL\_PUSCH\_Nominal}(j)$ and $P_{0\_UE\_PUSCH}(j)$. $P_{0NOMINAL\_PUSCH\_Nominal}(j)$ is a cell-specific value and is transmitted via cell-specific RRC signaling. $P_{0\_UE\_PUSCH}(j)$ is a UE-specific value and is transmitted via dedicated RRC signaling. The value of j denotes a grant type of PUSCH. In the LTE, j=0 denotes a semi-persistent grant, j=1 denotes a dynamic scheduled grant, and j=2 denotes a random access response.

4) $\alpha(j)$: This is a value for compensating a path loss between the eNB and the UE, and one of values $\{0, \ldots, 1\}$ is notified to the UE 101 through RRC signaling.

5) $\Delta_{TF}(i)$: In case of a system that considers analog beamforming, the transmission beam of the gNB used in a DL reference signal (e.g., a synchronous signal, a DMRS, a CSI-RS) may differ from the sounding reference signal (SRS) reception beam of the gNB 103. $\Delta_{TF}(i)$ is a parameter that compensates for a difference between such beams, and may be transmitted from the gNB 103 through signaling (e.g., downlink control information (DCI), media access control (MAC) control element, RRC, etc.).

6) PL: This refers to a path loss between the gNB 103 and the UE 101 for transmission power calculation, and is an index that indicates the performance of a link between the gNB 103 and the UE 101. In a system that uses analog beamforming, this may be represented by various values according to a beam or beam pair used by the gNB 103 and the UE 101.

7) f(i): This is a transmission power control parameter of uplink data channel, and is a closed loop parameter.

The parameter f(i) used in the i-th transmission unit may be obtained as follows. That is, f(i) may be obtained by accumulating a value transmitted by the gNB 103 to f(i−1) or by applying the value transmitted by the gNB 103 as it is. Whether such accumulation is enabled or disabled is determined by higher layer signaling of the gNB 103. Detailed operations are as follows.

7-1) When the gNB 103 performs signaling to the UE 101 to accumulate the closed loop parameter, the UE 101 performs the following Equation (1a).

$$f(i)=f(i-1)+\delta_{PUSCH}(i-K_{PUSCH}) \quad (1a)$$

7-2) When the gNB 103 performs signaling to the UE 101 not to accumulate the closed loop parameter, the UE 101 performs the following Equation (1b).

$$f_k(i)=\delta(i-K_{PUSCH}) \quad (1b)$$

$$P_{PUSCH}(i) = \min \begin{Bmatrix} P_{CMAX}(i), \\ 10\log_{10}(M_{PUSCH}(i)) + P_{0\ PUSCH}(j) + \alpha_{PUSCH}(j) \cdot PL + f(i) + \Delta_{TF}(i) \end{Bmatrix} [\text{dBm}] \quad \text{Equation (1)}$$

1) $P_{CMAX}(i)$: This is the maximum transmission power that can be used by the UE 101 in the i-th transmission unit, and is determined by a power class of the UE 101, parameters activated by the gNB 103, and various parameters stored in the UE 101.

In the above, $\delta_{PUSCH}(i-K_{PUSCH})$ is a value signaled in the i-$K_{PUSCH}$ transmission unit.

While $K_{PUSCH}$ is fixed to 4 in the frequency division duplex (FDD) system, $K_{PUSCH}$ is defined as shown in Table 1a below in the time division duplex (TDD) system. In Table 1A and 1B below, k is defined for TDD.

TABLE 1A $K_{PUSCH}$ Values in TDD System

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 1B k for TDD Configurations 0-6

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 6 | | | | 6 | 4 |
| 2 | | | | 4 | | | | | 4 | |
| 3 | 4 | | | | | | | | 4 | 4 |
| 4 | | | | | | | | | 4 | 4 |
| 5 | | | | | | | | 4 | | |
| 6 | 7 | 7 | | | | 7 | 7 | | | 5 |

For example, in case of TDD DL/UL Configuration 1, subframe numbers 2, 3, 7 and 8 denote uplink subframes, and subframe numbers 0, 1, 4, 5, 6 and 9 denote downlink subframes. For example, an uplink of subframe number 2 indicates that uplink transmission information is acquired from a downlink before the sixth. This uplink transmission information also includes $\delta_{PUSCH}(i-K_{PUSCH})$.

In addition, the value of $\delta_{PUSCH}(i-K_{PUSCH})$ is defined in Table 2 as follows.

TABLE 2

Example of TPC Command Field in DCI Format

| TPC Command Field in DCI format 0/0A/0B/3/4/4A/4B/6-0A/3B | Accumulated $\delta_{PUSCH, c}$ dB | Absolute $\delta_{PUSCH, c}$ dB only DCI format 0/0A/0B/4/4A/4B/6-0A |
|---|---|---|
| 0 | −1 | −4 |
| 1 | 0 | −1 |
| 2 | 1 | 1 |
| 3 | 3 | 4 |

7-3) Initialization of f(i): When the value of $P_{O\_UE\_PUSCH}(j)$ changes by eNB's upper signaling or when a random access response message is received from a serving eNB, f(i) is initialized.

In the LTE system, a rule for transmission of a corresponding PUSCH after transmission of a PDCCH is defined as shown in Table 1b above.

Figure 2:
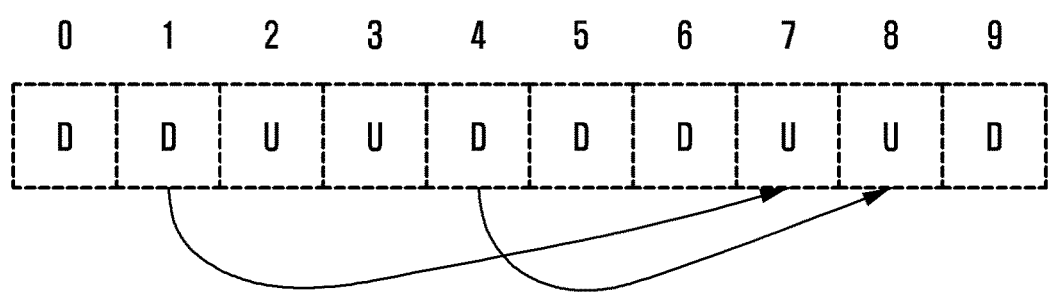
FIG. 2 is an illustration of a transmission relation between a downlink control channel and a corresponding uplink data channel according to an embodiment.

FIG. 2 is an illustration of a transmission relation between a downlink control channel and a corresponding uplink data channel according to an embodiment.

Referring to FIG. 2, in the TDD UL/DL Configuration 1, the transmission of a corresponding uplink data channel after the reception of a downlink control channel is performed as shown in FIG. 2. The transmission power necessary for the transmission of a corresponding data channel is calculated from Equation (1) above. In case of accumulating the closed loop parameter, the closed loop parameter used by the UE 101 in each transmission unit is operated according to the signaling of the gNB 103 and operated by applying the commands of the gNB 103. That is, the closed loop parameter f(i) of the UE 101 may be operated as expected by the gNB 103.

Examples: $f(7)=f(7-1)+\delta_{PUSCH}(7-K_{PUSCH})=0+3=3$, where $K_{PUSCH}=6$ $f(8)=f(8-1)+\delta_{PUSCH}(8-K_{PUSCH})=3+1=4$, where $K_{PUSCH}=4$ Table 3 below is an example of DCI information transmission and closed parameter update of UE/eNB.

TABLE 3

| | | Subframe Index | | | | | | | | | |
|---|---|---|---|---|---|---|---|---|---|---|---|
| | | 0 | 1 | 2 | 3 | 4 | 5 | 6 | 7 | 8 | 9 |
| DCI Info | $K_{PUSCH}$ | — | — | 6 | 4 | — | — | — | 6 | 4 | — |
| | $\delta_{PUSCH}$ (i) | — | 3 | — | — | 1 | — | 0 | — | — | 3 |
| UE f(i) | | 0 | 0 | 0 | 0 | 0 | 0 | 0 | 3 | 4 | 4 |
| eNB expected f(i) | | 0 | 0 | 0 | 0 | 0 | 0 | 0 | 3 | 4 | 4 |

In addition, if the method of operating the closed loop parameter for LTE power control is applied to a system in which the allocation of the uplink data channel is performed dynamically in the downlink control channel, a UE operation different from the expectation of the eNB may be caused. In this case, the dynamic allocation indicates that a time between the transmission of uplink allocation information (grant) on the PDCCH and the transmission of the PUSCH can be dynamically determined. In order to dynamically allocate the uplink data channel, information called K1 is introduced in the DCI of the PDCCH and is transmitted to the UE through the DCI.

Figure 3:
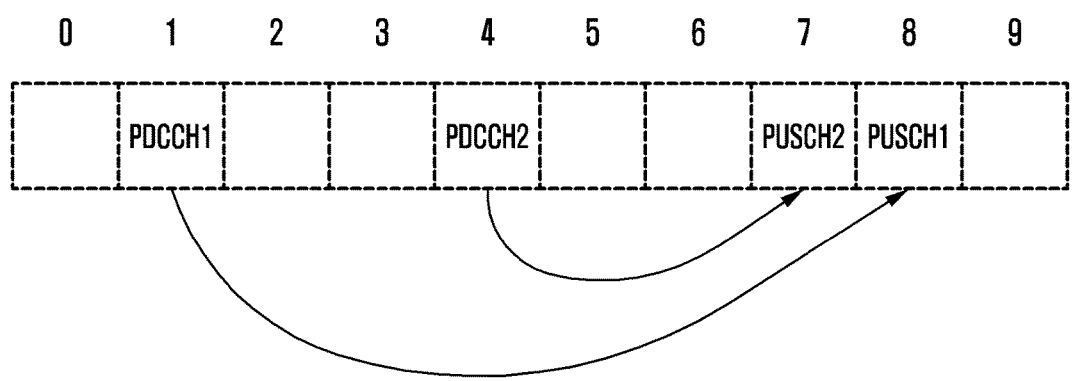
FIG. 3 is an illustration of a transmission relation between a downlink control channel and a corresponding uplink data channel according to an embodiment.

FIG. 3 is an illustration of a transmission relation between a downlink control channel and a corresponding uplink data channel according to an embodiment.

Referring to FIG. 3, the first transmission unit may send K1=7 to instruct the transmission of uplink data in the eighth transmission unit, and the fourth transmission unit may send K1=3 to instruct the transmission of uplink data in the seventh transmission unit. In this situation, if the closed loop parameter operation method of LTE is applied as it is, the closed loop parameter (f(8)=6) becomes different from the closed loop parameter expected by the eNB ($f_e(8)=3$) in the eighth transmission unit. The reason is that new uplink allocation and uplink data transmission are performed before the eNB transmits uplink allocation information and the UE transmits corresponding uplink data.

Examples: $f(7)=f(7-1)+\delta_{PUSCH}(7-K1)=0+3=3$, where K1=3

$f(8)=f(8-1)+\delta_{PUSCH}(8-K1)=3+3=6$, where K1=7

$f_e(8)=f_e(8-1)+\delta_{PUSCH}(8-K1)=0+3=3$, where K1=7

Table 4 below is an example of DCI information transmission and closed parameter update of UE/eNB.

TABLE 4

| | | Subframe Index | | | | | | | | | |
|---|---|---|---|---|---|---|---|---|---|---|---|
| | | 0 | 1 | 2 | 3 | 4 | 5 | 6 | 7 | 8 | 9 |
| DCI Info | K1 | — | 7 | — | — | 3 | — | — | — | — | — |
| | $\delta_{PUSCH}$ (i) | — | 3 | — | — | 3 | — | — | — | — | — |
| UE f(i) | | 0 | 0 | 0 | 0 | 0 | 0 | 0 | 3 | 6 | 6 |
| eNB expected $f_e(i)$ | | 0 | 0 | 0 | 0 | 0 | 0 | 0 | 1 | 0 | 3 |

In addition to the case of directly transmitting information such as K1 to the DCI, there may be scenarios of defining various K1s according to services. Such examples are a system where ultra-reliable low latency communication (URLLC) and enhanced mobile broadband (eMBB) coexist, a case where the transmission unit size varies (slot vs. mini-slot), and the like.

Figure 4:
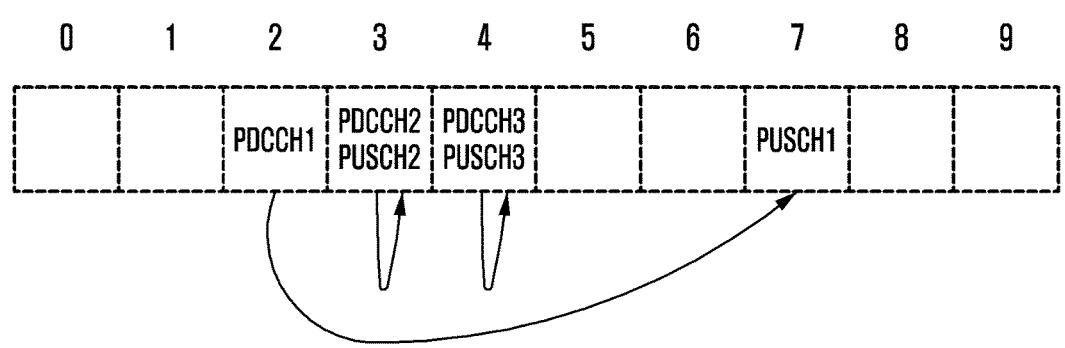
FIG. 4 is an illustration of a transmission relation between a downlink control channel and a corresponding uplink data channel according to an embodiment.

FIG. 4 is an illustration of a transmission relation between a downlink control channel and a corresponding uplink data channel according to an embodiment.

Referring to FIG. 4, an example is shown of a transmission relation between the downlink control channel and the corresponding uplink data channel when K1 of the eMBB service is 5 and K1 of the URLLC service is 0. Even in case of transmitting the service type of uplink data rather than transmitting the K1 value directly with the DCI, the same problem occurs.

Examples: $f(3)=f(3-1)+\delta_{PUSCH}(3-K1)=0+3=3$, where K1=0

$f(4)=f(4-1)+\delta_{PUSCH}(4-K1)=3+3=6$, where K1=0
$f(7)=f(7-1)+\delta_{PUSCH}(7-K1)=6+3=9$, where K1=5
$f_e(7)=f_e(7-1)+\delta_{PUSCH}(7-K1)=0+3=3$, where K1=5

Table 5 below is an example of DCI information transmission and closed parameter update of UE/eNB.

TABLE 5

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI Info | Service type (0 = eMBB, 1 = URLLC) | — | — | 0 (K1 = 5) | 1 (K1 = 0) | 1 (K1 = 0) | — | — | — | — | — |
|  | $\delta_{PUSCH}(i)$ | — | — | 3 | 3 | 3 | — | — | — | — | — |
|  | UE f(i) | 0 | 0 | 0 | 3 | 6 | 6 | 6 | 9 | — | — |
| eNB expected $f_e(i)$ | | 0 | 0 | 0 | 3 | 6 | 0 | 0 | 3 | — | — |

The above issue is that the closed loop parameter used in calculating the power for transmitting the uplink data in the i-th transmission unit is different from the value expected by the eNB. The present disclosure addresses an issue that arises in case of accumulating closed loop parameters, as follows.

The first embodiment is to update the closed loop parameter f(i) at the transmission time point (i) of uplink data by using the closed loop parameter f(i−K1) and the TPC command $\delta_{PUSCH}(i-K1)$ at the point in time (i−K1) when the eNB transmits grant information to instruct the transmission of uplink data. Equation (1c) is as follows:

$$\begin{cases} f(i) = f(i - K1) + \delta_{PUSCH}(i - K1) & \text{if } TPC \text{ Command is transmitted at } (i - T_d) \\ f(i) = f(i - 1) & \text{else} \end{cases} \quad (1c)$$

This embodiment allows the operation not affected in calculation of f(i) even though there are new resource allocation and corresponding uplink data transmission between transmission units i and i−K1. Thus, it can be applied as expected by the eNB (refer to FIG. 3).

Examples: $f(7)=f(7-K1)+\delta_{PUSCH}(7-K1)=0+3=3$, where K1=3

$f(8)=f(8-K1)+\delta_{PUSCH}(8-K1)=0+1=1$, where K1=7
$f_e(8)=f_e(8-K1)+\delta_{PUSCH}(8-K1)=0+1=1$, where K1=7

Table 6 below is an example of DCI information transmission and closed parameter update of UE/eNB.

TABLE 6

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI Info | K1 | — | 7 | — | — | 3 | — | — | — | — | — |
|  | $\delta_{PUSCH}(i)$ | — | 1 | — | — | 3 | — | — | — | — | — |
|  | UE f(i) | 0 | 0 | 0 | 0 | 0 | 0 | 0 | 3 | 1 | 1 |
| eNB expected $f_e(i)$ | | 0 | 0 | 0 | 0 | 0 | 0 | 0 | 3 | 1 | 1 |

The second embodiment is to apply the previous f(i−1) without updating f(i) at the transmission point in time (i) of uplink data when there are new grant and uplink data transmission between the uplink data transmission point in time (i) and the point in time (i−K1) when the eNB transmits grant information to instruct the transmission of uplink data. Even though f(i) in the 8th transmission unit is different from the expected result of the eNB, it is possible to obtain the effect of applying the latest information to f(i).

Examples: $f(7)=f(7-1)+\delta_{PUSCH}(7-K1)=0+3=3$, where K1=3

$f(8)=f(8-1)=3$
$f_e(8)=f_e(8-1)+\delta_{PUSCH}(8-K1)=0+1=1$

Table 7 below is an example of DCI information transmission and closed parameter update of UE/eNB.

TABLE 7

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI Info | K1 | — | 7 | — | — | 3 | — | — | — | — | — |
|  | $\delta_{PUSCH}(i)$ | — | 1 | — | — | 3 | — | — | — | — | — |
|  | UE f(i) | 0 | 0 | 0 | 0 | 0 | 0 | 0 | 3 | 3 | 3 |
| eNB expected $f_e(i)$ | | 0 | 0 | 0 | 0 | 0 | 0 | 0 | 3 | 1 | 3 |

The third embodiment is to use, but not store, f(i) updated by applying TPC command transmitted by the eNB when there are new grant and uplink data transmission between the uplink data transmission time point (i) and the time point (i−K1) when the eNB transmits grant information to instruct the transmission of uplink data. That is, f(i) used in the next transmission unit maintains a value before updated (refer to FIG. 3).

Examples: $f(7)=f(7-1)+\delta_{PUSCH}(7-K1)=0+3=3$, where K1=3

$f(8)=f(8-1)+\delta_{PUSCH}(8-K1)=0+1=1$, where K1=7
$f_e(8)=f_e(8-1)+\delta_{PUSCH}(8-K1)=0+1=1$, where K1=7

Table 8 below is an example of DCI information transmission and closed parameter update of UE/eNB.

TABLE 8

| | Subframe Index | | | | | | | | | |
|---|---|---|---|---|---|---|---|---|---|---|
| | | 0 | 1 | 2 | 3 | 4 | 5 | 6 | 7 | 8 | 9 |
| DCI Info | K1 | — | 7 | — | — | 3 | — | — | — | — | — |
| | $\delta_{PUSCH}$ (i) | — | 1 | — | — | 3 | — | — | — | — | — |
| UE f(i) | | 0 | 0 | 0 | 0 | 0 | 0 | 0 | 3 | 1 | 1 |
| eNB expected $f_e(i)$ | | 0 | 0 | 0 | 0 | 0 | 0 | 0 | 3 | 1 | 1 |

The fourth embodiment is to operate f(i) by using a value before a certain time ($T_a$) after a certain time ($T_p$) based on a point in time ($i-T_p$) at which the eNB transmits a transmit power control (TPC) command. $T_a$ and $T_p$ may be transmitted to the UE by the eNB through higher layer signaling or may be determined through negotiations between the eNB and the UE. Equation (1d) is as follows:

$$f(i)=f(i-T_a)+\delta_{PUSCH}(i-T_d) \text{ if TPC Command is transmitted at } (i-T_d)$$

$$f(i)=f(i-1) \text{else} \quad (1d)$$

In this case, it is assumed that $T_a$ is 1 and $T_p$ is 3 (refer to FIG. 3).

Examples: f(4)=f(4−1)+$\delta_{PUSCH}$(4−3)=0+1=1
f(7)=f(7−1)+$\delta_{PUSCH}$(7−3)=1+3=4
f(8)=f(7)

Table 9 below is an example of DCI information transmission and closed parameter update of UE/eNB.

TABLE 9

| | Subframe Index | | | | | | | | | |
|---|---|---|---|---|---|---|---|---|---|---|
| | | 0 | 1 | 2 | 3 | 4 | 5 | 6 | 7 | 8 | 9 |
| DCI Info | K1 | — | 7 | — | — | 3 | — | — | — | — | — |
| | $\delta_{PUSCH}$ (i) | — | 1 | — | — | 3 | — | — | — | — | — |
| UE f(i) | | 0 | 0 | 0 | 0 | 1 | 1 | 1 | 4 | 4 | 4 |
| eNB expected $f_e(i)$ | | 0 | 0 | 0 | 0 | 1 | 1 | 1 | 4 | 4 | 4 |

Various situations may arise in a system capable of dynamic allocation. The fifth embodiment is to allow the eNB to dynamically operate the closed loop parameter as well. In addition to a TPC command value, a field indicating how to apply and manage a TPC command is added to the DCI. For example, a TPC command usage field indicates how the UE applies a TPC command transmitted by the eNB. If the TPC command usage field is "0," the current TPC command is accumulated, and such accumulation is used to calculate the power for uplink data transmission and stored as the closed loop parameter. If the TPC command usage field is "1," the current TPC command is accumulated and used for power calculation of uplink data transmission, but the closed loop parameter stores a value before accumulation. If the TPC command usage field is "2," such accumulation is not performed, and the transmission power is calculated and stored using the current closed loop parameter.

Table 10 below is an example of TPC Command Field.

TABLE 10

| TPC Command Field in DCI format | Accumulated $\delta_{PUSCH, c}$ dB | Absolute $\delta_{PUSCH, c}$ dB |
|---|---|---|
| 0 | −1 | −4 |
| 1 | 0 | −1 |
| 2 | 1 | 1 |
| 3 | 3 | 4 |

Table 11 below is an example of TPC Command Usage Field.

TABLE 11

| TPC Command Usage Field in DCI format | Accumulation for TPC Command | Closed loop parameter after Accumulation action |
|---|---|---|
| 0 | Yes | Use for transmit power calculation and store accumulated value |
| 1 | Yes | Use for transmit power calculation and discard accumulated value |
| 2 | No | Use for transmit power calculation and store accumulated value |
| 3 | Reserved | Reserved |

The sixth embodiment is to operate f(i) with various values according to a beam, a beam group, a beam combination, a service type (eMBB, URLLC, etc.), a waveform (cyclic prefix orthogonal frequency division multiplexing (CP-OFDM), single carrier discrete Fourier transform SC-DFT, etc.), or subcarrier spacing (15 kHz, 30 kHz, 60 kHz, etc.).

If the LTE power control closed loop parameter is directly applied to the system in which the allocation of the uplink data channel is performed dynamically in the downlink control channel, another problem may arise.

Figure 5:
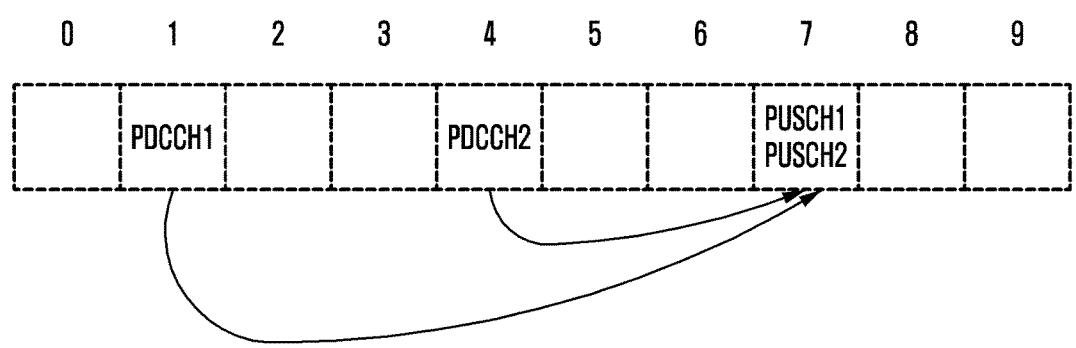
FIG. 5 is an illustration a transmission relation between a downlink control channel and a corresponding uplink data channel according to an embodiment.

FIG. 5 is an illustration a transmission relation between a downlink control channel and a corresponding uplink data channel according to an embodiment.

Referring to FIG. 5, when each of different transmission units sends K1 to designate the transmission unit for the transmission of uplink data, it may happen that a plurality of uplink data channels are scheduled to be transmitted in the same transmission unit. For example, when the first transmission unit sends K1=6 and $\delta_{PUSCH}$(1)=3 and the fourth transmission unit sends K1=3 and $\delta_{PUSCH}$(4)=1 as shown in FIG. 5, the 7th transmission unit may simultaneously transmit two uplink data channels. If the LTE transmission power calculation method is applied, f(i)=3 or f(i)=1 is applied differently to each uplink data channel. Since the LTE power control applies the same power control per symbol with respect to the uplink data channel, a problem occurs in case where f(i) has different values.

Table 12 below is an example of DCI information transmission and closed parameter update of UE/eNB.

TABLE 12

| | | Subframe Index | | | | | | | | | |
|---|---|---|---|---|---|---|---|---|---|---|---|
| | | 0 | 1 | 2 | 3 | 4 | 5 | 6 | 7 | 8 | 9 |
| DCI Info | M (RB number) | — | 4 | — | — | 1 | — | — | — | — | — |
| | K1 | — | 6 | — | — | 3 | — | — | — | — | — |
| | $\delta_{PUSCH}$ (i) | — | 3 | — | — | 1 | — | — | — | — | — |
| UE f(i) | | 0 | 0 | 0 | 0 | 0 | 0 | 0 | 3 or 1 | 3 or 1 | 3 or 1 |
| eNB expected $f_e(i)$ | | 0 | 0 | 0 | 0 | 0 | 0 | 0 | 3 or 1 | 3 or 1 | 3 or 1 |

The present disclosure addresses the above issue, as follows. The above issue is caused by the existence of a plurality of closed loop parameters used in calculation of power for transmitting data of a plurality of uplinks in the i-th transmission unit.

The first embodiment is that the UE applies a common closed loop parameter when there are two or more uplink data channels in the i-th transmission unit. The common closed loop parameter may be defined as follows. Taking the LTE power calculation method as an example, the most recently received TPC command based on the i-th transmission unit is used as the closed loop parameter of the i-th transmission unit. Equation (1e) is as follows:

$$f(i)=f(i-1)+\delta_{PUSCH}(i-K1) \quad (1e)$$

In the i-th transmission unit, K1 is the smallest value among a plurality of K1 values. That is, in the above example, 3 is selected as K1 from 3 and 7 in the 7th transmission unit, and the corresponding TPC command is applied to the calculation of the closed loop parameter. Therefore, $f(7)=f(7-1)+\delta_{PUSCH}(7-3)=0+1=1$.

Alternatively, even if another equation $f(i)=f(i-K1)+\delta_{PUSCH}(i-K1)$ is applied, $f(7)=f(7-3)+\delta_{PUSCH}(7-3)=01-1=1$.

In a variation of the first embodiment, the common closed loop parameter may be defined as follows. The TPC command offered for the transmission of data having the largest data amount (or resource amount, modulation order, etc.) among uplink data transmitted in the i-th transmission unit is used as the closed loop parameter of the i-th transmission unit. Equation (1f) is as follows:

$$f(i)=f(i-1)+\delta_{PUSCH}(i-K1) \quad (1f)$$

In the above example, between the resource amounts of the first and fourth transmission units allocated for uplink transmission of the 7th transmission unit, the allocated resource amount of the first transmission unit is larger. 6 is selected as K1, and the corresponding TPC command is applied to the calculation of the closed loop parameter. Therefore, $f(7)=f(7-1)+\delta_{PUSCH}(7-6)=0+3=3$.

Alternatively, even if another equation $f(i)=f(i-K1)+\delta_{PUSCH}(i-K1)$ is applied, $f(7)=f(7-6)+\delta_{PUSCH}(7-6)=0+3=3$.

The second embodiment is that, when there are two or more uplink data channels in the i-th transmission unit, the UE updates the closed loop parameter and calculates the transmission power by applying the TPC command corresponding to each uplink data channel. In order to calculate the closed loop parameter of the next transmission unit after transmitting a plurality of uplink data, one closed loop parameter is determined. A determination rule is as follows. The most recently received TPC command based on the i-th transmission unit is determined as a representative closed loop parameter of the i-th transmission unit. In the above example, 3 is selected as K1 from 3 and 7 in the 7th transmission unit, and the corresponding TPC command is applied to the calculation of the closed loop parameter. That is, the representative closed loop parameter of the 7th transmission unit is determined as $f(7)=f(7-1)+\delta_{PUSCH}(7-4)=0+1=1$. The representative closed loop parameter may be determined using a value used for the data channel having the largest resource amount among data channels of uplink in the i-th transmission unit, the largest TPC command value, or the like.

In addition, in the LTE system, the transmission power of the PUCCH in the i-th transmission unit, $P_{PUSCH}(i)$, may be determined as follows in Equation (2). The unit is dBm.

$$P_{PUCCH}(i) = \min\left\{ \begin{array}{l} P_{CMAX}(i), \\ P_{0\_PUCCH}(j) + PL + h(n_{CQI}, n_{HARQ}, n_{SR}) + \Delta_{F\_PUCCH}(F) + \Delta_{TxD}(F') + g(i) \end{array} \right\} [dBm] \quad \text{Equation (2)}$$

1) $P_{CMAX}(i)$: This is the maximum transmission power that can be used by the UE in the i-th transmission unit, and is determined by a power class of the UE, parameters activated by the eNB, and various parameters stored in the UE.

2) $P_{0\_PUCCH}(j)$: $P_{0\_PUCCH}(j)$ is composed of $P_{0NOMINAL\_PUCCH\_Nominal}(j)$ and $P_{0\_UE\_PUCCH}(j)$. $P_{0NOMINAL\_PUCCH\_Nominal}(j)$ is a cell-specific value and is transmitted via cell-specific RRC signaling. $P_{0\_UE\_PUCCH}(j)$ is a UE-specific value and is transmitted via dedicated RRC signaling. The value of j denotes a grant type of PUCCH. In the LTE, j=0 denotes a semi-persistent grant, j=1 denotes a dynamic scheduled grant, and j=2 denotes a random access response.

3) PL: This refers to a path loss between the eNB and the UE for transmission power calculation, and is an index that indicates the performance of a link between the eNB and the UE. In a system that uses analog beamforming, this may be represented by various values according to a beam or beam pair used by the eNB and the UE.

4) $h(n_{CQI}, n_{HARQ}, n_{SR})$: This is a value according to information amounts such as CQI, HARQ, and SR.

5) $\Delta_{F\_PUCCH}(F)$: This is a relative value according to a PUCCH format and is transmitted from a higher layer based on the PUCCH format 1a.

6) $\Delta_{TxD}(F')$: This is a value transmitted from a higher layer in case of using two antenna ports.

7) g(i): This is a transmission power control parameter of uplink control channel, and is a closed loop parameter.

The parameter g(i) used in the i-th transmission unit may be obtained as follows. That is, g(i) may be obtained by accumulating a value transmitted by the eNB to g(i−1), in Equation (2a) as follows.

$$g(i)=g(i-1)+\sum_{m=0}^{M-1}\delta_{PUCCH}(i-k_m) \quad (2a)$$

In the above, $\delta_{PUCCH}(i-k_m)$ is a value signaled in the $i-k_m$ transmission unit.

While $k_0$ is fixed to 4 and M is fixed to 1 in the FDD system, values of $k_0$ and M are defined as shown below in Table 13 in the TDD system.

TABLE 13

Downlink association set K: {$k_0, k_1, \ldots, k_{(M-1)}$} for TDD

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 6:
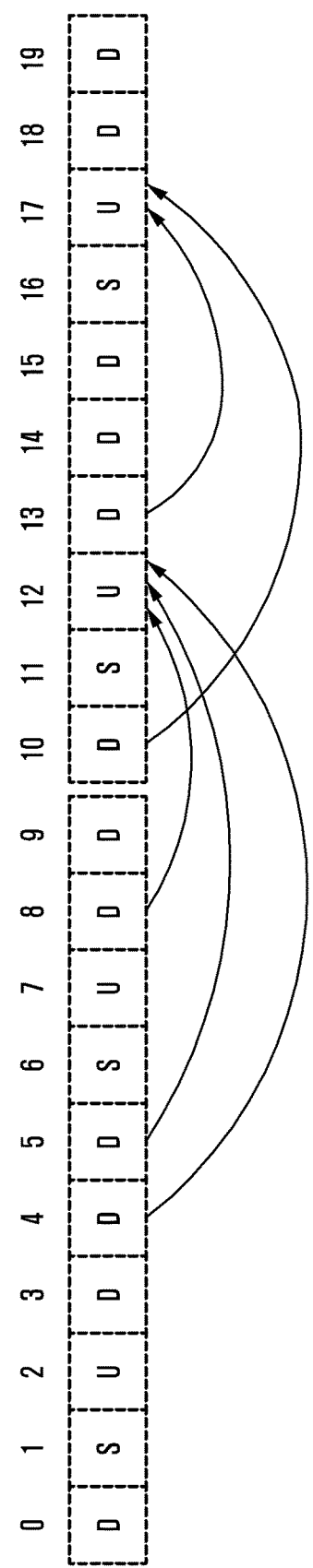
FIG. 6 is an illustration of a transmission relation between a downlink control/data channel and a corresponding uplink HARQ-ACK channel according to an embodiment.

FIG. 6 is an illustration of a transmission relation between a downlink control/data channel and a corresponding uplink HARQ-ACK channel according to an embodiment.

Referring to FIG. 6, in the LTE system, a rule for the transmission of downlink data (PDSCH) and hybrid automatic repeat request acknowledgement (HARQ-ACK) after the transmission of a PDCCH is defined as shown in Table 13 above. For example, in case of TDD UL/DL configuration 2, the UE receives the downlink control channel and the corresponding downlink data channel and then transmits the HARQ-ACK to inform whether such channels are received successfully, as shown in FIG. 6. The transmission power necessary for such data channel transmission is calculated using Equation (2) above. In this case, the closed loop parameter used by the UE in each transmission unit may be obtained as follows. The eNB may estimate the closed loop parameters used by the UE. A downlink assignment index (DAI) is an index transmitted to prevent an error of the HARQ-ACK in HARQ-ACK bundling of the PDSCH transmitted simultaneously in the next PUCCH transmission.

Examples) $g(12)=g(12-1)+\delta_{PUCCH}(4)+\delta_{PUCCH}(5)+\delta_{PUCCH}(6)+\delta_{PUCCH}(8)=5$,
where M=4
$g(17)=g(17-1)+\delta_{PUCCH}(10)+\delta_{PUCCH}(11)+\delta_{PUCCH}(12)+\delta_{PUCCH}(13)=7$,
where M=4

Table 14 below is an example of DCI information transmission and closed parameter update of UE/eNB.

TABLE 14

| | | Subframe Index | | | | | | | | | | | | |
|---|---|---|---|---|---|---|---|---|---|---|---|---|---|---|
| | | 4 | 5 | 6 | 7 | 8 | 9 | 10 | 11 | 12 | 13 | 14 | 15 | 16 | 17 |
| DCI Info | DAI | 0 | 1 | — | — | 2 | — | 0 | — | — | 1 | — | — | — | — |
| | $\delta_{PUSCH}(i)$ | 1 | 1 | — | — | 3 | — | 1 | — | — | 1 | — | — | — | — |
| | UE g(i) | 0 | 0 | 0 | 0 | 0 | 0 | 0 | 0 | 5 | 5 | 5 | 5 | 5 | 7 |
| | eNB expected $g_e(i)$ | 0 | 0 | 0 | 0 | 0 | 0 | 0 | 0 | 5 | 5 | 5 | 5 | 5 | 7 |

On the other hand, if the LTE power control closed loop parameter is applied to a system in which the allocation of the transmission of PDSCH and HARQ-ACK is performed dynamically after the transmission of PDCCH, a UE operation different from the expectation of the eNB may be caused. In this case, the dynamic allocation indicates that a time between the transmission of downlink allocation information (grant) and the transmission of the HARQ-ACK can be dynamically determined. A time between downlink control channel transmission and downlink data channel transmission is defined as K0, and a time between downlink data channel transmission and corresponding HARQ-ACK transmission is defined as K2. Both are transmitted through the DCI.

Figure 7:
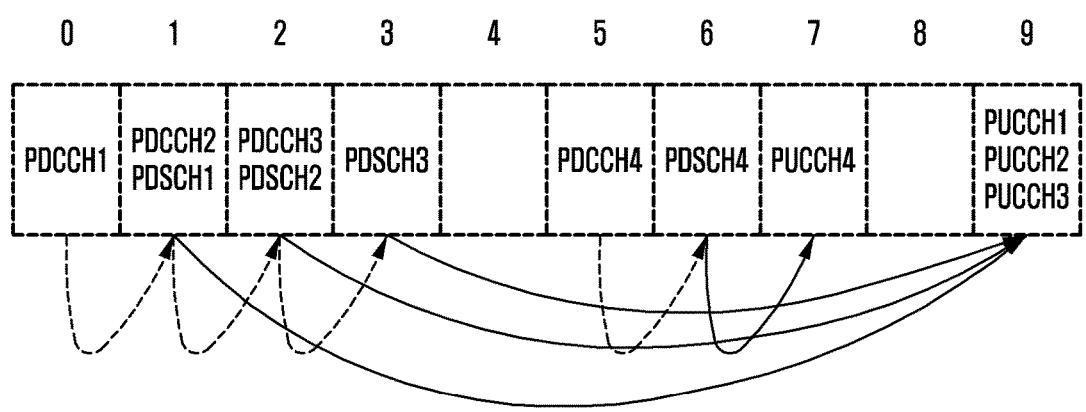
FIG. 7 is an illustration of a transmission relation between a downlink control/data channel and a corresponding uplink HARQ-ACK channel according to an embodiment.

FIG. 7 is an illustration of a transmission relation between a downlink control/data channel and a corresponding uplink HARQ-ACK channel according to an embodiment.

Referring to FIG. 7, the 0th transmission unit sends K0=1 for the transmission of downlink data in the first transmission unit and sends K2=8 for the transmission of HARQ-ACK. Also, the first transmission unit sends K0=1 for the transmission of downlink data in the second transmission unit and sends K2=7 for the transmission of HARQ-ACK, and the second transmission unit sends K0=1 for the transmission of downlink data in the third transmission unit and sends K2=6 for the transmission of HARQ-ACK. Thus, in the 9th transmission unit, the HARQ-ACK is transmitted in response to three PDSCHs. In addition, the 5th transmission unit sends K0=1 for the transmission of downlink data in the 6th transmission unit and sends K2=1 for the transmission of HARQ-ACK. In this situation, if the closed loop parameter of LTE is applied as it is, the closed loop parameter (g(9)=6) becomes different from the closed loop parameter expected by the eNB ($g_e(9)=3$) in the 9th transmission unit. The reason is that new downlink allocation and uplink HARQ-ACK transmission are performed before the eNB transmits downlink data and the UE transmits corresponding HARQ-ACK.

Examples) $g(7)=g(7-1)+\delta_{PUCCH}(5)=0+3=3$, where DAI count=1
$g(9)=g(9-1)+\delta_{PUCCH}(0)+\delta_{PUCCH}(1)+\delta_{PUCCH}(2)=3+1+1+1=6$,
where DAI count=3

Table 15 below is an example of DCI information transmission and closed parameter update of UE/eNB.

TABLE 15

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI | K0 | 1 | 1 | 1 | — | — | 1 | — | — | — | — |
| Info | K2 | 8 | 7 | 6 | — | — | 1 | — | — | — | — |
|  | DAI | 0 | 1 | 2 | — | — | 0 | — | — | — | — |
|  | $\delta_{PUSCH}(i)$ | 1 | 1 | 1 | — | — | 3 | — | — | — | — |
|  | UE g(i) | 0 | 0 | 0 | 0 | 0 | 0 | 0 | 3 | 3 | 6 |
| eNB expected $g_e(i)$ | | 0 | 0 | 0 | 0 | 0 | 0 | 0 | 3 | 3 | 3 |

In addition to case of directly introducing information such as K0 and K2 to the DCI, there may be scenarios having various K0s and K2s according to services. Such examples are a system where URLLC and eMBB coexist, a case where the transmission unit size varies (slot vs. minislot), and the like.

Figure 8:
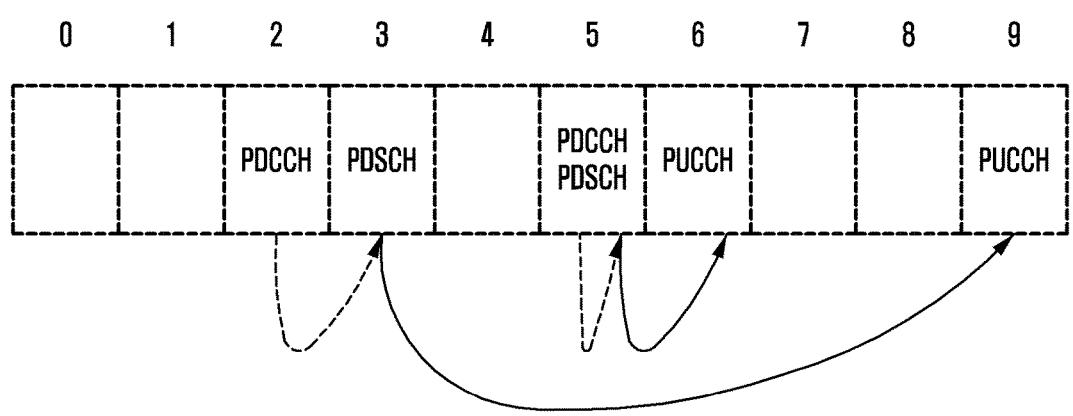
FIG. 8 is an illustration of a transmission relation between a downlink control/data channel and a corresponding uplink HARQ-ACK channel according to an embodiment.

FIG. 8 is an illustration of a transmission relation between a downlink control/data channel and a corresponding uplink HARQ-ACK channel according to an embodiment.

Referring to FIG. 8, an example is shown of a transmission relation between the downlink control and data channels and the corresponding uplink HARQ-ACK channels in case where K0=1 and K2=6 in the eMBB service and K0=0 and K2=1 in the URLLC service. Even in case of transmitting the service type of downlink data rather than transmitting the K0 and K2 values directly with the DCI, the same problem occurs.

Examples) g(6)=g(6−1)+$\delta_{PUCCH}$(5)=0+3=3, where DAI count=1 g(9)=g(9−1)+$\delta_{PUCCH}$(2)=3+1=4, where DAI count=1

Table 16 below is an example of DCI information transmission and closed parameter update of UE/eNB.

TABLE 16

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI | Service type | — | — | 0 | — | — | 0 | — | — | — | — |
| Info | (0 = eMBB, | | | (K0 = 1 | | | (K0 = 0 | | | | |
|  | 1 = URLLC) | | | K2 = 6) | | | K2 = 1) | | | | |
|  | DAI | — | — | 0 | — | — | 0 | — | — | — | — |
|  | $\delta_{PUSCH}(i)$ | — | — | 1 | — | — | 3 | — | — | — | — |
|  | UE g(i) | 0 | 0 | 0 | 0 | 0 | 0 | 3 | 3 | 3 | 4 |
| eNB expected $g_e(i)$ | | 0 | 0 | 0 | 0 | 0 | 0 | 3 | 3 | 3 | 1 |

The above issue is that the closed loop parameter used in calculating the power for transmitting the uplink HARQ-ACK in the i-th transmission unit is different from the value expected by the eNB. The present disclosure addresses an issue that arises in case of accumulating closed loop parameters, as follows.

The first embodiment is to update the closed loop parameter g(i) at the transmission point in time (i) of uplink HARQ-ACK by using the closed loop parameter g(i−K0−K2) and the TPC command $\delta_{PUCCH}(i)$ at the time point (i−K0−K2) when the eNB transmits grant information to instruct the transmission of uplink HARQ-ACK.

However, when there are a plurality of HARQ-ACKs to be transmitted at the transmission time i, a reference g(i−K0−K2) is based on the largest or arbitrary K0+K2.

Examples) g(7)=g(7−1)+$\delta_{PUCCH}$(5)=0+3=3, where DAI count=1 g(9)=g(9−1−8)+$\delta_{PUCCH}$(0)+$\delta_{PUCCH}$(1)+$\delta_{PUCCH}$(2)=0+1+1+1=6, where DAI count=3

Table 17 below is an example of DCI information transmission and closed parameter update of UE/eNB.

TABLE 17

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI | K0 | 1 | 1 | 1 | — | — | 1 | — | — | — | — |
| Info | K2 | 8 | 7 | 6 | — | — | 1 | — | — | — | — |
|  | DAI | 0 | 1 | 2 | — | — | 0 | — | — | — | — |
|  | $\delta_{PUSCH}(i)$ | 1 | 1 | 1 | — | — | 3 | — | — | — | — |
|  | UE g(i) | 0 | 0 | 0 | 0 | 0 | 0 | 0 | 3 | 3 | 3 |
| eNB expected $g_e(i)$ | | 0 | 0 | 0 | 0 | 0 | 0 | 0 | 3 | 3 | 3 |

The second embodiment is to apply the previous g(i−1) without updating g(i) at the transmission point in time (i) of uplink HARQ-ACK when there are new grant and uplink HARQ-ACK transmission between the uplink HARQ-ACK transmission point in time (i) and the point in time (i−K0−K2) when the eNB transmits grant information to instruct the transmission of uplink HARQ-ACK.

The third embodiment is to use, but not store, g(i) updated by applying TPC command transmitted by the eNB when there are new grant and uplink HARQ-ACK transmission between the uplink HARQ-ACK transmission time point (i) and the point in time (i−K0−K2) when the eNB transmits grant information to instruct the transmission of uplink HARQ-ACK. That is, g(i) used in the next transmission unit maintains a value before updated.

Examples) g(7)=g(7−1)+$\delta_{PUCCH}$(5)=0+3=3, where DAI count=1 g(9)=g(9−1)+$\delta_{PUCCH}$(0)+$\delta_{PUCCH}$(1)+$\delta_{PUCCH}$(2)=0+1+1+1=3, where DAI count=3

Table 18 below is an example of DCI information transmission and closed parameter update of UE/eNB.

TABLE 18

|  |  | Subframe Index | | | | | | | | | |
|---|---|---|---|---|---|---|---|---|---|---|---|
|  |  | 0 | 1 | 2 | 3 | 4 | 5 | 6 | 7 | 8 | 9 |
| DCI | K0 | 1 | 1 | 1 | — | — | 1 | — | — | — | — |
| Info | K2 | 8 | 7 | 6 | — | — | 1 | — | — | — | — |
|  | DAI | 0 | 1 | 2 | — | — | 0 | — | — | — | — |
|  | $\delta_{PUSCH}(i)$ | 1 | 1 | 1 | — | — | 3 | — | — | — | — |
|  | UE g(i) | 0 | 0 | 0 | 0 | 0 | 0 | 0 | 3 | 0 | 3 |
| eNB expected $g_e(i)$ | | 0 | 0 | 0 | 0 | 0 | 0 | 0 | 3 | 0 | 3 |

Various situations may arise in a system capable of dynamic allocation. The fourth embodiment is to allow the eNB to dynamically operate the closed loop parameter as well. In addition to a TPC command value, a field indicating how to apply and manage a TPC command is added to the DCI. For example, a TPC command usage field indicates how the UE applies a TPC command transmitted by the eNB. If the TPC command usage field is "0," the current TPC command is accumulated, and such accumulation is used to calculate the power for uplink data transmission and stored as the closed loop parameter. If the TPC command usage field is "1," the current TPC command is accumulated and used for power calculation of uplink data transmission, but the closed loop parameter stores a value before accumulation. If the TPC command usage field is "2," such accumulation is not performed, and the transmission power is calculated and stored using the current closed loop parameter.

The fifth embodiment is to operate g(i) with various values according to a beam, a beam group, a beam combination, a service type (eMBB, URLLC, etc.), a waveform (CP-OFDM, SC-DFT, etc.), or subcarrier spacing (15 kHz, 30 kHz, 60 kHz, etc.).

In addition, if the LTE power control method is applied to a system using beamforming, the following issue may arise. Since path losses are different according to beam combinations, the eNB may not be able to achieve the desired reception power when ignoring a beam combination and applying a common path loss to the transmission power of uplink. Therefore, in the beamforming system, it is required to estimate and apply an appropriate path loss according to the UE transmission beam and the eNB reception beam. Assuming that the appropriate path loss is applied according to beam combinations, the transmission power $P_{PUSCH,k}(i)$ of PUSCH of the k-th beam in the i-th transmission unit may be determined as follows. The unit is dBm.

The transmission power of the beamforming system may be operated using Equation (3) as follows.

$$P_{PUSCH,k}(i) = \min\left\{\begin{array}{l}P_{CMAX}(i),\\ 10\log_{10}(M_{PUSCH}(i)) + P_{0\ PUSCH,k}(j) + \alpha_{PUSCH,k}(j) \cdot PL_k + f_k(i) + \Delta_{TF}(i)\end{array}\right\}[\text{dBm}]$$

Equation (3)

In particular, parameters such as $P_{0\ PUSCH,k}(j)$, $\alpha_{PUSCH,k}(j)$, $PL_k$, and $f_k(i)$ may be managed for each beam or beam combination or managed as a common value. In addition, the closed loop parameter $f_k(i)$ may have the following problem. Unlike the open loop parameter, the closed loop parameter performs a function of reducing an error by continuously feed-backing and updating a difference from a current state. In order to reduce an error of transmission power by using the closed loop parameter, continuous and periodic feedback of information is required. However, if there are a plurality of beam combinations between the eNB and the UE and if a beam change happens frequently, the continuous and periodic update of information is impossible, and thus a closed loop may not be performed properly. If the power control operation method of LTE is applied as it is, it is difficult to dynamically operate a series of operations such as initialization, accumulation and maintenance of the closed loop parameter. Accordingly, a new operation method is needed.

A new method for operating the closed loop parameter is as follows.

The first embodiment is an explicit operation method through the DCI.

This is a method of directly signaling initialization, accumulation, maintenance, etc. of closed loop parameter values through the DCI in the operation of accumulating the closed loop parameter. This directly signaling method may insert a reset in the TPC command field as shown in Table 19 below or add a TPC reset field in addition to the TPC command field as shown in Table 20 below. When the TPC reset field is transmitted, the previous $f_k(i)$ is used or the $f_k(i)$ is initialized to zero.

TABLE 19

Example of TPC Command Field in DCI Format

| TPC Command Field in DCI format | Accumulated $\delta_{PUSCH,c}$ dB | Absolute $\delta_{PUSCH,c}$ dB |
| --- | --- | --- |
| 0 | −4 | −4 |
| 1 | −2 | −2 |
| 2 | −1 | −1 |
| 3 | 0 | 0 |
| 4 | 1 | 1 |
| 5 | 2 | 2 |
| 7 | 4 | 4 |
| 8 | reset (absolute value = 0) | 6 |

TABLE 20

TPC Command Field and Reset Field in DCI Format

| | Accumulated $\delta_{PUSCH,c}$ dB | Absolute $\delta_{PUSCH,c}$ dB |
| --- | --- | --- |
| TPC Command Field in DCI format | | |
| 0 | −3 | −4 |
| 1 | 1 | −1 |
| 2 | 1 | 1 |
| 3 | 3 | 4 |

TABLE 20-continued

TPC Command Field and Reset Field in DCI Format

| | Accumulated $\delta_{PUSCH,c}$ dB | Absolute $\delta_{PUSCH,c}$ dB |
| --- | --- | --- |
| TPC Reset Field in DCI format | | |
| 0 | Accumulation | Absolute value |
| 1 | reset (absolute value = 0) | 0 |

Figure 9:
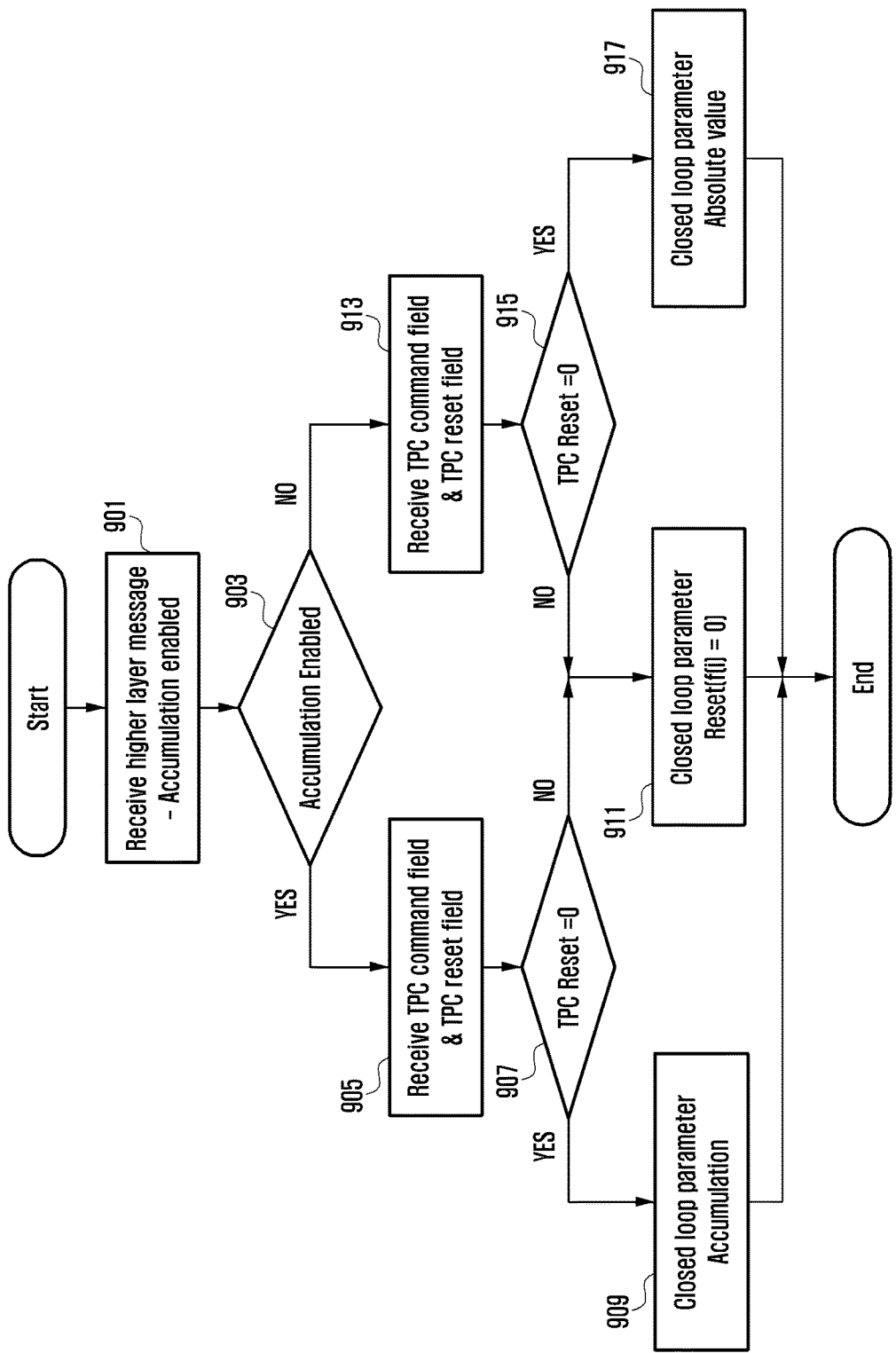
FIG. 9 is a flowchart of a method according to an embodiment.

FIG. 9 is a flowchart of a method according to an embodiment.

Referring to FIG. 9, the UE receives an accumulation message from a higher layer at 901 and performs a certain operation of a closed loop parameter by using a TPC command field and a TPC reset field which are transmitted through DCI. In 901, an accumulation state is determined. In an accumulation enabled state in 905, a TPC command field and a TPC reset field are received. In 907, it is determined if the TPC reset field is "0." If the TPC reset field is "0," the UE continuously performs accumulation using the TPC command value in 909. If the TPC reset field is "1," the UE initializes the closed loop parameter $f_k(i)$ to zero regardless of the TPC command value in 911. In addition, in an accumulation disabled state in 913, a TPC command field and a TPC reset field are received. In 915, it is determined if the TPC reset field is "0." If the TPC reset field is "0," the UE applies the TPC command value in 917, and if the TPC reset field is "1," the UE initializes the closed loop parameter $f_k(i)$ to zero in 911. This method is operated by a need of the eNB regardless of a beam change between the eNB and the UE.

The second embodiment is an implicit operation method through higher layer signaling.

This method allows the UE to initialize the closed loop parameter when a beam change occurs between the eNB and the UE.

That is, the higher layer signaling is defined and used as follows: accumulation enabled, accumulation enabled with beam change condition 1, accumulation enabled with beam change condition 2, and accumulation disabled.

The accumulation enabled allows the UE to accumulate the closed loop parameter by using the TPC command of the DCI regardless of a beam change between the eNB and the UE.

The accumulation enabled with beam change condition 1 allows the UE to initialize the closed loop parameter even if there is the TPC command of the DCI when a change occurs in a UE transmission beam.

The accumulation enabled with beam change condition 2 allows the UE to initialize the closed loop parameter if a beam change between the eNB and the UE occurs by a command of the eNB.

The accumulation disabled allows the UE to apply an absolute value by using the TPC command of the DCI regardless of a beam change between the eNB and the UE.

Figure 10:
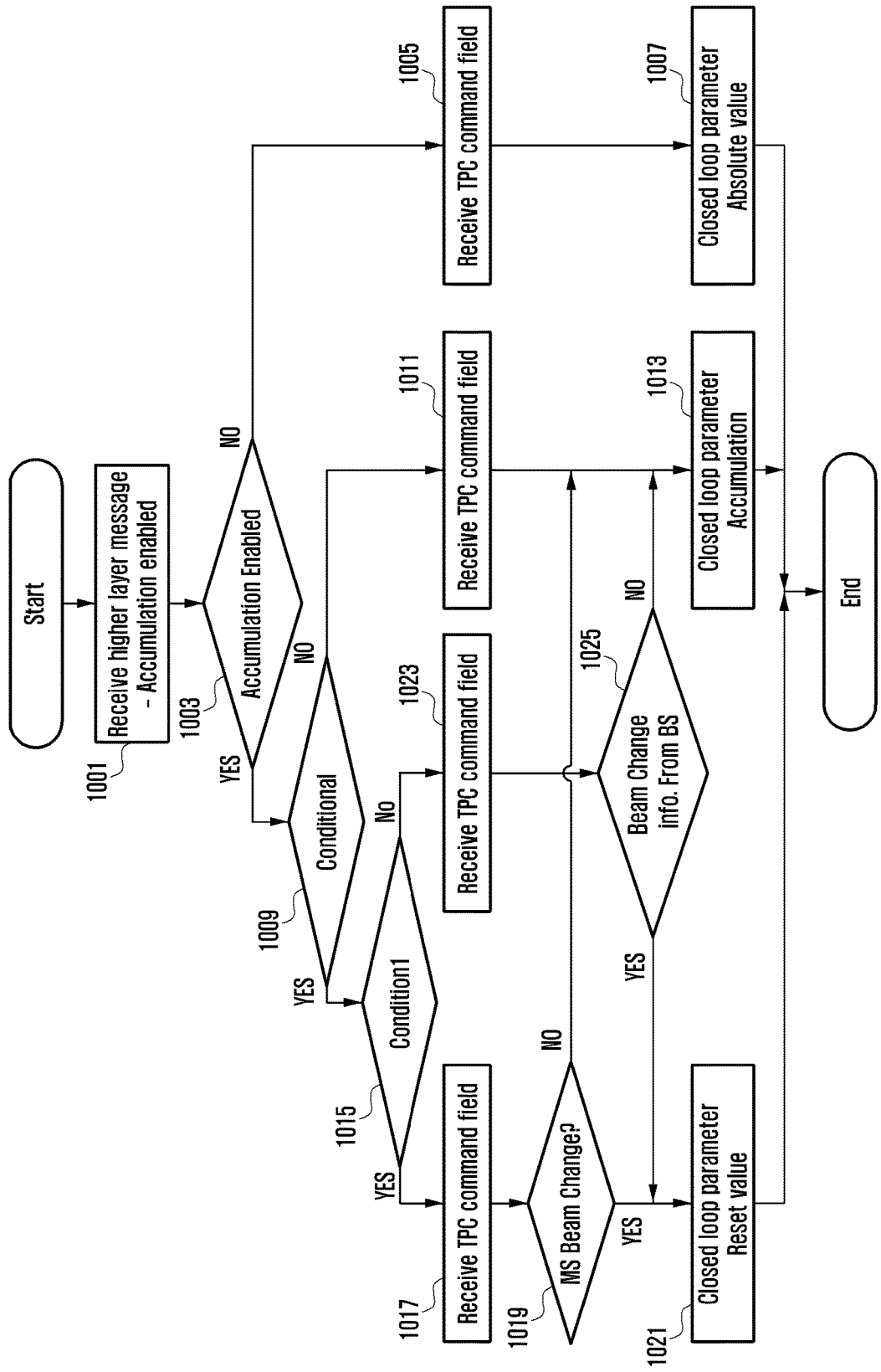
FIG. 10 is a flowchart of a method according to an embodiment.

FIG. 10 is a flowchart of a method according to an embodiment.

Referring to FIG. 10, the UE receives a higher layer message transmitted by the eNB in 1001. In 1003, it is determined if accumulation is enabled. In a case where the accumulation is disabled in 1005, the UE receives a TPC command field and applies an absolute value by using a TPC command value in 1007. In a case where the accumulation is enabled in 1009, it is determined if there is a condition, where the operation is varied depending on whether there is a condition. If there is no condition in 1011, the UE receives a TPC command field and performs accumulation using a TPC command value in 1013. In 1015, it is determined if there is an accumulation condition 1. In a case where the accumulation condition 1 in 1017, the UE receives a TPC command field in 1017 and checks whether a UE beam changes in 1019 (the eNB may not know the beam change). If the MS beam changes, the UE initializes the closed loop parameter in 1021, otherwise, the UE performs accumulation in 1013. In a case where there is an accumulation condition 2, the UE receives a TPC command field in 1023, determines if there is beam change information from a base station in 1025, initializes the closed loop parameter in 1021 only when the eNB explicitly changes a beam (the eNB knows the beam change), and performs accumulation using a TPC command value in 1013 when there is no beam change information from the base station.

The third embodiment is to use both the explicit and implicit methods.

In this embodiment, the upper layer signaling is used to initialize the closed loop parameter when the UE recognizes the beam change as described in the implicit method, and also a field for initializing the closed loop parameter is applied to the TPC command of the DCI. That is, even though there is no beam change, the eNB can dynamically initialize the closed loop parameters of the UE.

In case of the uplink control channel, a plurality of transmission formats may exist depending on the amount of information to be transmitted, a generation method, or the like. Each transmission format uses an independent transmission power equation. For example, in case of the PUCCH of LTE, different equations are applied to format 1/1a/1b/2/2a/2b/3 and format 4/5, as follows.

The transmission power of PUCCH format 1/1a/1b/2/2a/2b/3 is as follows in Equation (4).

$$P_{PUCCH(i)} = \min\left\{ \begin{array}{c} P_{Cmax}(i) \\ P_{0\_PUCCH} + PL + h(n_{CQI}, n_{HARQ}, n_{SR}) + \Delta_{F_{PUCCH}}(F) + \Delta_{TxD}(F') + g(i) \end{array} \right\} [dBm] \quad (4)$$

The transmission power of PUCCH format 4/5 is as follows in Equation (5).

$$P_{PUCCH(i)} = \min\left\{ \begin{array}{c} P_{Cmax}(i) \\ P_{0\_PUCCH} + PL + 10\log_{10}(M_{PUCCH}(i)) + \Delta_{F_{PUCCH}}(F) + \Delta_{TF}(i) + g(i) \end{array} \right\} [dBm] \quad (5)$$

As in LTE, there may be a plurality of schemes of power calculation for transmission of the uplink control channel in a new system (e.g., a new radio access technology (RAT)). The closed loop parameter used in each power control may be operated as follows.

The uplink control channel has a control channel of transmitting a small amount of information and a control channel of transmitting a large amount of information. The control channel that transmits a small amount of information reflects the concept of bundling. That is, each of HACK-ACK/non-acknowledgement (NACK) for a plurality of downlink data channels is determined as one HACK-ACK/NACK bit through an AND logical operation. Therefore, one bit is very important, and the closed loop parameter transmitted through the PDCCH allocating downlink data transmission is accumulated. On the other hand, the uplink control channel that transmits a large amount of information is transmitted by multiplexing HACK-ACK/NACK for all data channels received on the downlink. Because the importance of an information bit transmitted in the uplink control channel may vary, there may be no need to use the closed loop parameters of other formats. Therefore, the eNB may operate the closed loop parameter applied to each PUCCH format in various types as follows.

1) Type of independently operating by a power scheme of the uplink control channel
2) Type of operating in common regardless of a power scheme of the uplink control channel
    2-1) Operating similar to existing LTE
    2-2) Signaling a reset, an update to existing value, a new update, etc. when the closed loop parameter is applied
3) Type of signaling the operating type 1, 2-1 or 2-2 on a higher layer by the eNB
4) Type of signaling the operating type 1, 2-1 or 2-2 on the PDCCH by the eNB In a system capable of operating at least one frequency hopping when transmitting the uplink control channel, a frequency hopping pattern of the uplink control channel transmitted by the UE may be signaled by the eNB or performed by the UE in a promised manner. Then, the reception performance of the control channel may vary depending on the hopping pattern or whether hopping is made at the transmission of the uplink control channel. In this case where the performance of the uplink control channel varies, adjusting the transmission power according to the reception performance may reduce the power consumption of the UE and also reduce the interference amount to the neighbor eNB.

As shown below, $\Delta_{FH}(H)$ is applied to a PUCCH transmission power calculation equation. Although the LTE PUCCH transmission power calculation equation is used as an example in this disclosure, the same may be applied equally to other transmission power as in Equation (6) as follows.

$P_{PUCCH(i)} = \min$ $$P_{PUCCH(i)} = \min \left\{ \begin{array}{l} P_{Cmax}(i) \\ P_{0\_PUCCH} + PL + h(n_{CQI}, n_{HARQ}, n_{SR}) + \Delta_{F_{PUCCH}}(F) + \Delta_{FH}(H) + \Delta_{TxD}(F') + g(i) \end{array} \right\} [dBm]$$

$\Delta_{FH}(H)$ is a value depending on frequency hopping or not and a frequency hopping pattern.

One method of applying $\Delta_{FH}(H)$ is to signal $\Delta_{FH}(H)$ from a higher layer. This value is transmitted as a relative or absolute value for each hopping pattern based on a certain hopping pattern. Another method is to define and apply a value according to a frequency hopping pattern. The frequency hopping value may be determined based on the performance by the frequency hopping pattern, and may also relate to a bandwidth part, a carrier frequency, a waveform, and the like of the UE.

In one embodiment, when considering only frequency hopping or not and a difference according to a frequency hopping pattern, the eNB determines and operates relative values based on a certain hopping pattern as shown in Table 21 below. Although the hopping pattern 1 is used as a reference, any other hopping pattern may be used alternatively.

TABLE 21

| Type | Value |
|---|---|
| Non-Hopping | −1 |
| Hopping pattern 1 | 0 |
| Hopping pattern 2 | 1 |
| ... | ... |

In another embodiment, if the frequency hopping or not and the performance of the frequency hopping pattern are influenced by the bandwidth part (BWP) of the UE, the eNB operates values by further considering the BWP of the UE as shown below in Table 22. In this case, Table 22 below may be wholly informed to the UE, but the UE may transmit only the corresponding BWP value. A performance difference by the center frequency or waveform may be operated in the same way.

TABLE 22

| | Value |
|---|---|
| BWP #1 | |
| Non-Hopping | −1 |
| Hopping pattern 1 | 0 |
| Hopping pattern 2 | 1 |
| ... | ... |
| BWP #2 | |
| Non-Hopping | −0.5 |
| Hopping pattern 1 | 0 |
| Hopping pattern 2 | 0.5 |
| ... | ... |

TABLE 22-continued

| | Value |
|---|---|
| ... | |
| BWP #N | |
| Non-Hopping | −2 |
| Hopping pattern 1 | 0 |
| Hopping pattern 2 | 2 |
| ... | ... |

Unlike LTE, in a system that applies CP-OFDM when transmitting the uplink control channel, control channel resources may be allocated contiguously or non-contiguously. Depending on the allocation type, the reception performance of the uplink control channel may vary. In case where the performance of the uplink control channel varies, adjusting the transmission power according to the reception performance can reduce the power consumption of the UE and reduce the interference amount to the neighbor eNB.

As shown below in Equation (7), $\Delta_{RA}(A)$ is applied to a PUCCH transmission power calculation equation. Although the LTE PUCCH transmission power calculation equation is used as an example in this disclosure, the same may be applied equally to other transmission power.

$$P_{PUCCH(i)} = \min \left\{ \begin{array}{l} P_{Cmax}(i) \\ P_{0\_PUCCH} + PL + h(n_{CQI}, n_{HARQ}, n_{SR}) + \Delta_{F_{PUCCH}}(F) + \Delta_{RA}(A) + \Delta_{TxD}(F') + g(i) \end{array} \right\} [dBm] \quad (7)$$

$\Delta_{RA}(A)$ is a value depending on the type of PUCCH resource allocation.

One method of applying $\Delta_{RA}(A)$ is to signal $\Delta_{RA}(A)$ from a higher layer. This value is transmitted as a relative or absolute value for each resource allocation type based on a certain resource allocation type. Another method is to define and apply a value according to a resource allocation type.

In an embodiment, considering a difference according to a resource allocation type, the eNB determines and operates relative values based on a certain allocation type as shown in Table 23 below. Although the contiguous allocation is used as a reference, any other allocation type may be used alternatively.

TABLE 23

| Type | Value |
|---|---|
| Contiguous Allocation | 0 |
| Non-contiguous Allocation 1 | 0.5 |
| Non-contiguous Allocation 2 | 1 |
| ... | ... |

Figure 11:
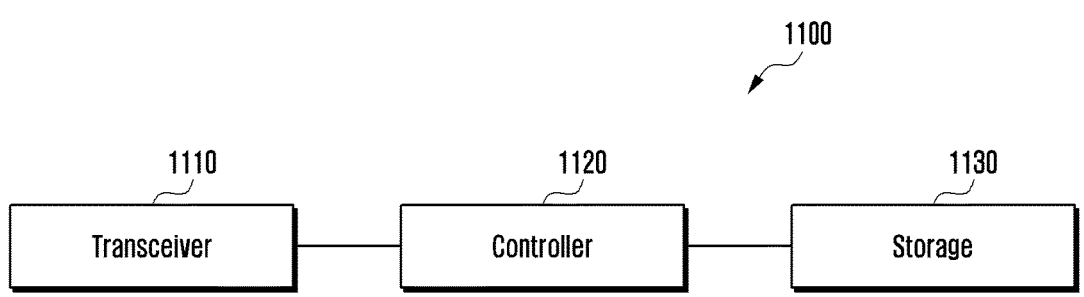
FIG. 11 is a block diagram of a terminal according to an embodiment.

FIG. 11 is a block diagram of a terminal 1100 according to an embodiment.

Referring to FIG. 11, the terminal 1100 (also referred to as a UE or an MS) may include a transceiver 1110, a controller 1120, and storage 1130. In the present disclosure, the controller 1120 may be defined as a circuit, an application-specific integrated circuit (ASIC), or at least one processor.

The transceiver 1110 may transmit and receive signals to and from other network entities. For example, the transceiver 1110 may receive system information, a synchronization signal, or a reference signal from a base station.

The controller 1120 may control the overall operation of the terminal 1100 according to embodiments of the present disclosure. For example, the controller 1120 may control a signal flow between blocks to perform the above-described operation.

The storage 1130 may store at least one of information transmitted or received through the transceiver 1110 and information generated through the controller 1120.

Figure 12:
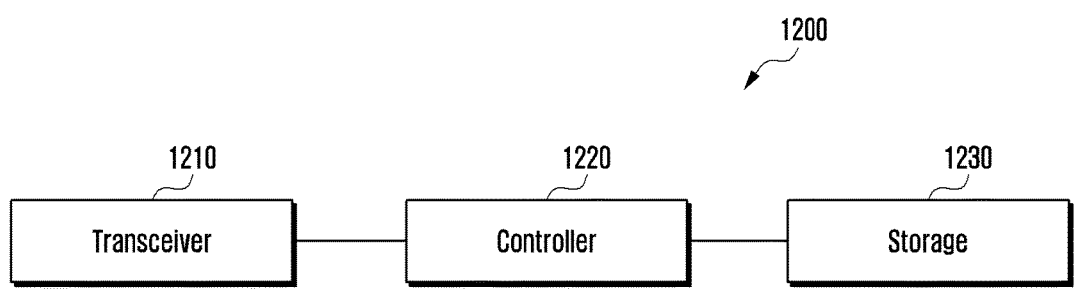
FIG. 12 is a block diagram of a base station according to an embodiment.

FIG. 12 is a block diagram of a base station 1200 according to an embodiment.

Referring to FIG. 12, the base station 1200 (also referred to as an eNB, gNB, or BS) may include a transceiver 1210, a controller 1220, and storage 1230. In the present disclosure, the controller 1220 may be defined as an ASIC, or at least one processor.

The transceiver 1210 may transmit and receive signals to and from other network entities. For example, the transceiver 1210 may transmit system information, a synchronization signal, or a reference signal to a terminal.

The controller 1220 may control the overall operation of the base station 1200 according to an embodiment. For example, the controller 1220 may control a signal flow between blocks to perform the above-described operation.

The storage 1230 may store at least one of information transmitted or received through the transceiver 1210 and information generated through the controller 1220.

While the present disclosure has been particularly shown and described with reference to embodiments thereof, it is clearly understood that the same is by way of illustration and example only and is not intended to be taken in conjunction with the present disclosure. It will be understood by those skilled in the art that various changes in form and details may be made therein without departing from the subject matter and scope of the present disclosure as defined by the appended claims and their equivalents.

What is claimed is:

1. A method for transmitting data by a terminal in a mobile communication system, the method comprising:
receiving, from a base station, first control information in a first time point, wherein the first control information instructs the terminal to transmit a first uplink data in a fourth time point;
receiving, from the base station, second control information in a second time point after the first time point, wherein the second control information instructs the terminal to the terminal to transmit a second uplink data in a third time point before the fourth time point;
transmitting, to the base station, the second uplink data in the third time point based on the second control information; and
determining a transmission power of the first uplink data corresponding to the first control information based on a transmission power of the second uplink data.

2. The method of claim 1, wherein the transmission power of the first uplink data is determined based on the transmission power of the second uplink data and a power parameter for transmitting the first uplink data included in the first control information.

3. The method of claim 1, wherein determining the transmission power of the first uplink data comprises:
identifying an elapsed time after the transmission of the second uplink data;
determining the transmission power of the first uplink data based on the transmission power of the second uplink data and a power parameter for transmitting the first uplink data included in the first control information, in a case where the elapsed time is less than a predetermined threshold; and
determining the transmission power of the first uplink data based on the transmission power of the second uplink data, in a case where the elapsed time is greater than or equal to the predetermined threshold.

4. The method of claim 1, further comprising:
receiving, from the base station, information on a power parameter for determining the transmission power of the first uplink data.

5. A method for receiving data by a base station in a mobile communication system, the method comprising:
transmitting, to a terminal, first control information in a first time point, wherein the first control information instructs the terminal to transmit a first uplink data in a fourth time point;
transmitting, to the terminal, second control information in a second time point after the first time point, wherein the second control information instructs the terminal to transmit a second uplink data in a third time point before the fourth time point;
receiving, from the terminal, the second uplink data in the third time point based on the second control information; and
determining a transmission power of the first uplink data transmitted by the terminal based on a transmission power of the second uplink data transmitted by the terminal.

6. The method of claim 5, wherein the transmission power of the first uplink data transmitted by the terminal is determined based on the transmission power of the second uplink data transmitted by the terminal and a power parameter for receiving the first uplink data included in the first control information.

7. The method of claim 5, wherein determining the transmission power of the first uplink data transmitted by the terminal comprises:

identifying an elapsed time after receiving the second uplink data;

determining the transmission power of the first uplink data transmitted by the terminal based on the transmission power of the second uplink data transmitted by the terminal and a power parameter for receiving the first uplink data included in the first control information, in a case where the elapsed time is less than a predetermined threshold; and determining the transmission power of the first uplink data transmitted by the terminal based on the transmission power of the second uplink data transmitted by the terminal, in a case where the elapsed time is greater than or equal to the predetermined threshold.

8. The method of claim 5, further comprising:

transmitting, to the terminal, information on a power parameter for determining the transmission power of the first uplink data transmitted by the terminal.

9. A terminal in a mobile communication system, the terminal comprising:

a transceiver; and a controller coupled with the transceiver and configured to:
control the transceiver to receive, from a base station, first control information in a first time point, wherein the first control information instructs the terminal to transmit a first uplink data in a fourth time point,
control the transceiver to receive, from the base station, second control information in a second time point after the first time point, wherein the second control information instructs the terminal to transmit a second uplink data in a third time point before the fourth time point,
control the transceiver to transmit, to the base station, the second uplink data in the third time point based on the second control information, and
determine a transmission power of the first uplink data corresponding to the first control information based on a transmission power of the second uplink data.

10. The terminal of claim 9, wherein the controller is further configured to determine the transmission power of the first uplink data based on the transmission power of the second uplink data and a power parameter for transmitting the first uplink data included in the first control information.

11. The terminal of claim 9, wherein the controller is further configured to:
identify an elapsed time after the transmission of the second uplink data,
determine the transmission power of the first uplink data based on the transmission power of the second uplink data and a power parameter for transmitting the first uplink data, included in the first control information, in a case where the elapsed time is less than a predetermined threshold, and
determine the transmission power of the first uplink data based on the transmission power of the second uplink data, in a case where the elapsed time is greater than or equal to the predetermined threshold.

12. The terminal of claim 9, wherein the controller is further configured to control the transceiver to receive, from the base station, information on a power parameter for determining the transmission power of the first uplink data.

13. A base station in a mobile communication system, the base station comprising:

a transceiver; and a controller coupled with the transceiver and configured to:
control the transceiver to transmit, to a terminal, first control information in a first time point, wherein the first control information instructs the terminal to transmit a first uplink data in a fourth time point,
control the transceiver to transmit, to the terminal, second control information in a second time point after the first time point, wherein the second control information instructs the terminal to transmit a second uplink data in a third time point before the fourth time point,
control the transceiver to receive, from the terminal, the second uplink data in the third time point based on the second control information, and
determine a transmission power of the first uplink data transmitted by the terminal based on a transmission power of the second uplink data transmitted by the terminal.

14. The base station of claim 13, wherein the controller is further configured to determine the transmission power of the first uplink data transmitted by the terminal based on the transmission power of the second uplink data transmitted by the terminal and a power parameter for receiving the first uplink data included in the first control information.

15. The base station of claim 13, wherein the controller is further configured to:
identify an elapsed time after receiving the second uplink data,
determine the transmission power of the first uplink data transmitted by the terminal based on the transmission power of the second uplink data transmitted by the terminal and a power parameter for receiving the first uplink data included in the first control information, in a case where the elapsed time is less than a predetermined threshold, and
determine the transmission power of the first uplink data transmitted by the terminal based on the transmission power of the second uplink data transmitted by the terminal, in a case where the elapsed time is greater than or equal to the predetermined threshold.

* * * * *